March 14, 1961 G. L. CLAPPER 2,975,303

DIFFERENTIATOR AND MIXER CIRCUIT

Filed May 22, 1958

INVENTOR
GENUNG L. CLAPPER

BY

G. R. Gugger

AGENT

United States Patent Office 2,975,303

Patented Mar. 14, 1961

2,975,303

DIFFERENTIATOR AND MIXER CIRCUIT

Genung L. Clapper, Vestal, N.Y., assignor to International Business Machines Corporation, New York, N.Y., a corporation of New York Filed May 22, 1958, Ser. No. 737,117

4 Claims. (Cl. 307—88.5)

This invention relates to a signal differentiating and mixing circuit and in particular to a circuit of the type referred to employing semiconductor devices or transistors.

Briefly, the basic transistor comprises a small block of semiconductor material to which are applied at least three electrodes, termed base, collector, and emitter, respectively. The semiconductor material may be of either n-type (indicating that the charges in the material normally available for carrying current are negative, i.e., electrons) or p-type (indicating that the charges in the material normally available for carrying current are positive, i.e., holes). It has been found that silicon and germanium, and particularly the latter, are suitable semiconductor materials. In the original point contact, or "Type A" transistor, and the fieldistor, the body block is composed of only one type of semiconductor material before surface treatment, and in the case of germanium, the type usually employed is n-type. In the case of the junction transistor, the body block is composed of three or more layers of alternately n- and p-type semiconductor material (usually germanium) and the contacts are of the ohmic type, rather than being point contacts. When potentials are properly applied between the base and each of the other two electrodes, a translating device is produced wherein variations in current in the collector-base or output circuit are produced by variations in current in the emitter-base or input circuit.

In many applications it is desirable or necessary to differentiate and mix a plurality of parallel input signal pulses. For example, many times it is desirable to produce a sequence of short well-shaped pulses from several parallel and overlapping input pulses. The known resistance-capacitance differentiating circuit has certain disadvantages, as is well known in the art, such as distortion and noise. Also, in a parallel resistance-capacitance coupling network substantial interaction and loss of signal to adjoining input capacitors will occur due to the rather large voltage swings across the resistors.

Accordingly, the principal feature of the present invention is the provision of a novel differentiating and mixer circuit which utilizes a translating device in the form of a transistor having its emitter connected to receive directly the displacement current from a plurality of input signal capacitors.

Another feature of the present invention is the provision of a novel differentiating and mixer circuit which utilizes translating devices in the form of transistors and which includes positive feedback for pulse shaping, a definite noise rejection threshold, excellent recovery time, and no interaction or signal loss between input capacitors.

Other features of the present invention will be pointed out in the following description and claims and illustrated in the accompanying drawings which disclose, by way of example, the principle of the invention and the best mode which has been contemplated of applying that principle.

Figure 1:
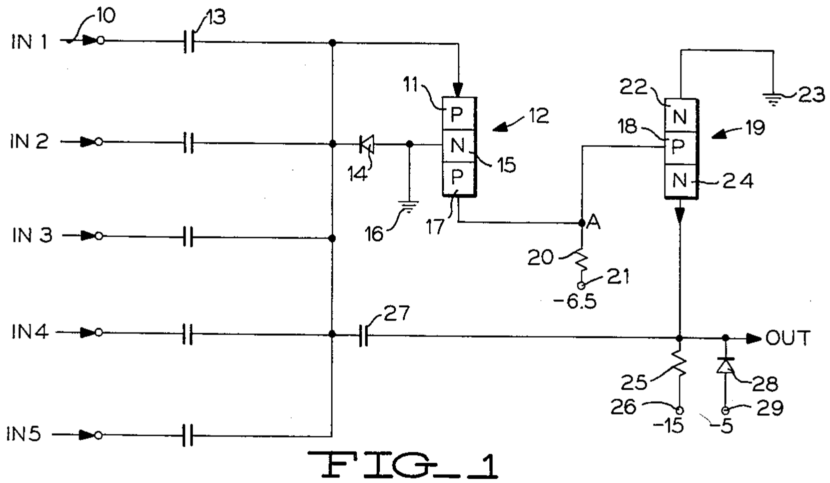
Fig. 1 shows an embodiment of a differentiator and mixer circuit in accordance with the present invention.

Referring to Fig. 1, a plurality of parallel inputs 10 are shown connected in common to the emitter electrode 11 of a PNP type transistor 12. Each input circuit includes a series capacitor 13 and in addition a diode 14 is connected between the base electrode 15 of the PNP transistor and a common point of the capacitor input circuits. The base electrode 15 is shown connected to a source of ground potential at 16 and, hence, transistor 12 is normally in a nonconductive state in the absence of an input signal.

The PNP transistor 12 is a current operated voltage amplifier and the output or collector electrode 17 is connected to the base electrode 18 of an NPN emitter follower transistor 19. The base electrode 18 is shown connected through a resistor 20 to a negative 6.5 volt terminal 21 and the emitter follower is normally biased in the nonconductive state. The emitter follower collector electrode 22 is connected to a source of ground potential 23 and the emitter electrode 24 is connected through a resistor 25 to a negative 15 volt terminal 26. A feedback path is provided between the emitter of the emitter follower and the common input to the PNP transistor through a capacitor 27.

A positive-going pulse at any of the inputs 10 will result in a current displacement in the related input capacitor 13 which drives the PNP transistor into conduction. Assuming input capacitors of 150 micro-micro-farads, a feedback capacitor of 150 micro-micro-farads, the resistor 20 to be 10,000 ohms, resistor 25 to be 4700 ohms, and the voltage values as shown, these circuit values being chosen merely to illustrate one practical working circuit, the voltage swing at the emitter 11 will be limited to a positive 0.3 volt which is the saturation voltage of the PN emitter-base diode. This negligible voltage swing limits the amount of charge distributed to the other input capacitors 13 and provides isolation of the inputs 10 to prevent interaction. The low impedance of the PNP transistor in parallel with the diode 14 assures fast recovery from either a positive or negative transient.

The PNP voltage amplifier output at point A is sufficient to drive the NPN emitter follower transistor from cutoff to saturation and the resulting low impedance output is fed back via capacitor 27 to the PNP transistor input to assure output pulses of full amplitude and to provide shaping.

A clamping diode 28 is connected between the emitter follower output and a negative 5 volt terminal 29 to clamp the lower level of the output pulses at negative 5 volts. A definite threshold for noise rejection is obtained by biasing the NPN emitter follower well beyond cutoff through the negative 6.5 volt terminal 21.

Figure 2:
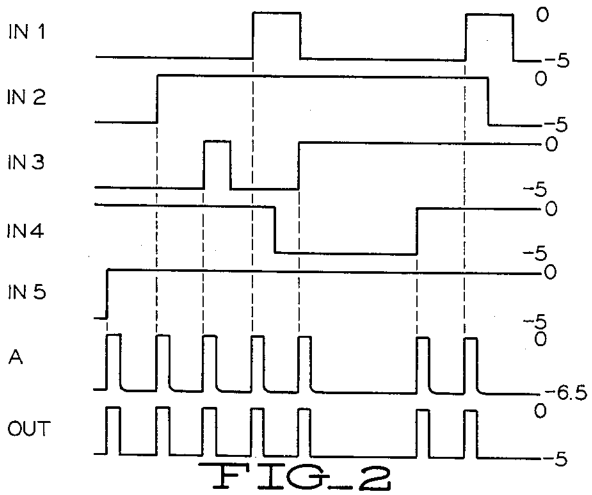
Fig. 2 is a diagram showing representative waveforms for the circuit shown in Fig. 1.

As shown in Fig. 2, a well-shaped positive pulse, which is of about one microsecond duration, is produced for each positive-going transient on any of the five inputs 10. It should be understood that the present circuit will operate just as well with negative input and output pulses by employing an NPN voltage amplifier and a PNP emitter follower.

Figure 3:
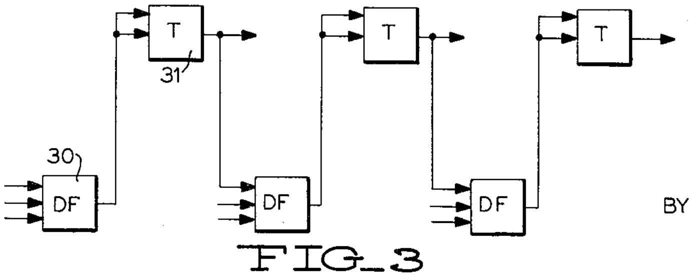
Fig. 3 is a block diagram illustrating one use of the present invention.

The block diagram in Fig. 3 shows how the above-described differentiating circuit, indicated by the blocks 30 in Fig. 3, may be used as the coupling element between binary counter triggers 31 to form a side-entry accumulator. The three inputs 32 to the differentiating circuit may be, for example, overlapping addend, augend and carry pulses.

It can be readily understood that the direct application of the current displacement in the input capacitors to the emitter with no significant swing in emitter voltage results in a true differentiation to produce a reliable sequence of short output pulses which are extremely useful in controlling computer circuitry and the like.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A differentiating and mixer circuit comprising a current operated voltage amplifying transistor having emitter, collector and base electrodes, an emitter follower transistor having emitter, collector and base electrodes, a plurality of capacitors arranged in parallel and having a common connection with the emitter of said amplier transistor, means for biasing both said transistors substantially nonconducting, means for applying input pulses to said capacitors whereby the displacement current of each capacitor pulsed is applied directly to the emitter of said amplifier transistor to drive same into conduction, and a connection between the collector electrode of said amplifier and the base electrode of said emitter follower whereby said emitter follower is rendered conductive and produces a low impedance output pulse for each input pulse to said capacitors.

2. A differentiator and mixer circuit as in claim 1 and including a feedback connection having a capacitor between the emitter of said emitter follower and the common connection of said input capacitors for shaping said output pulses.

3. A differentiator and mixer circuit as in claim 1 wherein means are provided to bias said emitter follower well beyond cutoff to establish a definite threshold for noise rejection.

4. A differentiating and mixer circuit comprising a PNP junction transistor having emitter, collector and base electrodes, means biasing said transistor substantially nonconducting, a plurality of capacitors arranged in parallel and having a common connection with the emitter of said transistor, means for applying input pulses to said capacitors whereby the displacement current of each capacitor pulsed is applied directly to said emitter to drive said transistor into conduction, the voltage swing at said emitter being limited to the saturation voltage of the PN emitter-base diode to limit the charge distributed to said capacitors and provide isolation of said inputs, an NPN junction transistor having emitter, collector and base electrodes, means biasing said NPN transistor substantially nonconducting, said NPN transistor operating as an emitter follower and biased in a state of conduction during conduction of said PNP transistor to provide a low impedance output pulse for each input pulse to said capacitors.

References Cited in the file of this patent

UNITED STATES PATENTS

| | | |
|---|---|---|
| 2,627,039 | MacWilliams | Jan. 27, 1953 |
| 2,670,445 | Felker | Feb. 23, 1954 |
| 2,861,258 | Walsh et al. | Nov. 18, 1958 |
| 2,879,411 | Faulkner | Mar. 24, 1959 |

FOREIGN PATENTS

| | | |
|---|---|---|
| 736,760 | Great Britain | Sept. 14, 1955 |